Patented Sept. 15, 1953

2,652,417

UNITED STATES PATENT OFFICE 2,652,417

1,2,3,10b-TETRAHYDROFLUORANTHENE-10b-CARBOXYLIC ACID

Eliot Steinberg, North Arlington, N. J., assignor to Warner-Hudnut, Inc., New York, N. Y., a corporation of Delaware No Drawing. Application October 6, 1951, Serial No. 250,190

6 Claims. (Cl. 260—469)

1

This invention relates to aminoalkyl esters of 1,2,3,10*b* - tetrahydrofluoranthene-10*b*-carboxylic acid which are useful as antispasmodic agents, e. g., for the treatment of gastrointestinal spasms. These esters have the formula

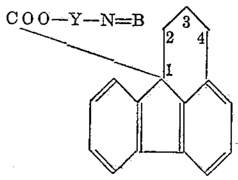

in which Y is an alkylene bridge having 2 or 3 carbon atoms, and —N=B is a tertiary amino group in which B represents two alkyl groups having a total of not more than 12 carbon atoms, or the atoms necessary to complete a heterocyclic ring. Thus Y is one of the divalent hydrocarbon radicals, ethylene, propylene, or isopropylene, and —N=B is dimethylamino, diethylamino, dibutylamino, dihexylamino, diisopropylamino, di-secondary-butylamino, or other dialkyl group in which the alkyl groups may be alike or different, or a saturated heterocyclic structure such as N-pyrrolidyl, N-piperidyl, and N-morpholinyl.

These compounds are generally used in the form of water-soluble acid addition salts or quaternary ammonium derivatives. The acids used to prepare the salts are those which produce, when combined with the basic esters, salts whose anions are non-toxic in therapeutic doses of the salts, including such mineral acids as hydrochloric acid, phosphoric acid, hydrobromic acid and sulfuric acid; and organic acids such as acetic, tartaric, citric, levulinic and succinic acids. The quaternary ammonium derivatives are obtained by the addition of alkyl or aralkyl esters of strong organic or inorganic acids, such as methyl bromide, ethyl chloride, benzyl bromide or methyl sulfate, to the basic ester. Dosage level is about 100 mg. three times a day, for adults. The products will ordinarily be supplied as tablets, but may be administered in other forms, or in combination with other agents, such as antacids, mucin, etc.

The compounds of the invention are readily prepared by reaction of 1,2,3,10*b*-tetrahydrofluoranthene-10*b*-carboxylic acid with the aminoalkyl halide to obtain the ester. Alternative methods of esterification include reaction of the acid halide with an alkylamino alcohol, reaction of the alkali metal salt of the acid with an alkylamino halide hydrohalide, and ester interchange or transesterification.

2

The invention will be illustrated by the following specific examples:

*Example 1. Beta-diethylaminoethyl 1,2,3,10b-tetrahydrofluoranthene - 10b - carboxylate hydrochloride*

A solution of 8.0 g. of 1,2,3,10*b*-tetrahydrofluoranthene-10*b*-carboxylic acid and 4.6 g. of beta-diethylaminoethyl chloride in 60 ml. of anhydrous isopropyl alcohol is refluxed for 2½ hours. The reaction mixture is cooled to room temperature and the precipitated ester hydrochloride is filtered off and dried and then recrystallized from absolute ethyl alcohol. The melting point of the hydrochloride salt is 215.5–217° C. The hydrochloride salt may also be purified by suspending the compound in water, making alkaline with aqueous sodium hydroxide and extracting with ether. The ether solution is dried with a suitable drying agent and then treated with alcoholic hydrochloric acid to precipitate the pure hydrochloride salt.

*Example 2. Beta-diethylaminoethyl 1,2,3,10b-tetrahydrofluoranthene - 10b - carboxylate methobromide*

7.0 g. of the aqueous ester hydrochloride is converted to the free base with caustic soda solution and extracted with ether. The dried ether solution is concentrated in vacuo to remove the ether. The residual oily ester is taken up in 100 ml. of absolute ethyl alcohol and quaternized with methyl bromide gas. The resulting solution is concentrated in vacuo to about one-third its volume and dry ether added. The precipitated quaternary salt is filtered off in the absence of moist air and recrystallized from an alcohol-ether mixture. Melting point of the quaternary ammonium ester is 156–157° C.

*Example 3. Beta-diethylamino-beta-methyl-ethyl 1,2,3,10b-tetrahydrofluoranthene - 10b - carboxylate hydrochloride*

A solution of 8.0 g. of 1,2,3,10*b*-tetrahydrofluoranthene-10*b*-carboxylic acid and 5.1 g. of beta-diethylamino-beta-methyl-ethyl chloride in 60 ml. of anhydrous isopropyl alcohol is refluxed as in Example 1 and the hydrochloride salt isolated in the form of white crystals as in Example 1.

*Example 4. Beta-dimethylaminoethyl 1,2,3,10b-tetrahydrofluoranthene - 10b - carboxylate hydrochloride*

This is prepared by the method described in Example 1, using as starting materials beta-dimethylaminoethyl chloride and 1,2,3,10*b*-tetrahydrofluoranthene-10b-carboxylic acid. On recrystallization from dry isopropyl alcohol, it melts at 227–227.5° C.

*Example 5. Beta-dimethylaminoethyl 1,2,3,10b-tetrahydrofluoranthene-10b-carboxylate methobromide*

This is prepared by the method described in Example 2, using as starting materials the parent ester hydrochloride and methyl bromide. This compound recrystallized from absolute alcohol melts at 217.5–218° C.

*Example 6. Beta-(1-pyrrolidyl)-ethyl 1,2,3,10b-tetrahydrofluoranthene-10b-carboxylate hydrochloride*

This compound is prepared by the method described in Example 1, using as starting materials 1-(beta-chloroethyl) pyrrolidine and 1,2,3,10b-tetrahydrofluoranthene-10b-carboxylic acid. This compound melts at 196–197.5° C.

*Example 7. Beta-(1-pyrrolidyl)-ethyl 1,2,3,10b-tetrahydrofluoranthene-10b-carboxylate methobromide*

This compound is prepared by the method described in Example 2, using as starting materials the parent ester hydrochloride and methyl bromide. This compound melts at 201–202° C.

*Example 8. Beta-(1-piperidyl)-ethyl 1,2,3,10b-tetrahydrofluoranthene-10b-carboxylate hydrochloride*

This compound is prepared by the procedure described in Example 1, using as starting materials 1-(beta-chloroethyl)piperidine and 1,2,3,-10b-tetrahydrofluoranthene-10b-carboxylic acid. This compound melts at 217–218° C. The corresponding morpholinyl compound, prepared from N-(beta-chloroethyl)-morpholine, is similar in character.

*Example 9. Beta-(1-piperidyl)-ethyl 1,2,3,10b-tetrahydrofluoranthene-10b-carboxylate methobromide*

This compound is prepared by the method described in Example 2, using as starting materials the parent ester hydrochloride and methyl bromide. This compound melts at 227–228° C.

*Example 10. Gamma-diethylamino-propyl 1,2,-3,10b-tetrahydrofluoranthene-10b-carboxylate hydrochloride*

This compound is prepared by the method described in Example 1 using as starting materials gamma-diethylaminopropyl chloride and 1,2,3,-10b-tetrahydrofluoranthene-10b-carboxylic acid, followed by recrystallization from dry isopropyl alcohol.

*Example 11. Beta-dihexylaminoethyl 1,2,3,10b-tetrahydrofluoranthene-10b-carboxylate hydrochloride*

This is prepared by the procedure of Example 1 using as starting materials beta-dihexylaminoethyl chloride and 1,2,3,10b-tetrahydrofluoranthene-10b-carboxylic acid, with purification by recrystallization from dry isopropyl alcohol.

I claim:

1. Compounds of the formula

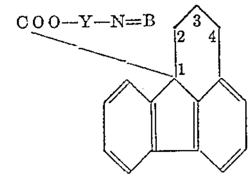

in which Y is a divalent acyclic saturated hydrocarbon radical having not less than 2 nor more than 3 carbon atoms with the linkages to the oxygen and the nitrogen atoms being to different carbon atoms, and —N=B is a radical selected from the class consisting of dialkylamino radicals with a total of not more than 12 carbon atoms, pyrrolidyl, piperidyl and morpholinyl radicals.

2. Beta-diethylaminoethyl 1,2,3,10b-tetrahydrofluoranthene-10b-carboxylate.

3. Beta-(1-pyrrolidyl)-ethyl 1,2,3,10b-tetrahydrofluoranthene-10b-carboxylate.

4. Beta-(1-piperidyl)-ethyl 1,2,3,10b-tetrahydrofluoranthene-10b-carboxylate.

5. Beta-dimethylaminoethyl 1,2,3,10b-tetrahydrofluoranthene-10b-carboxylate.

6. Gamma-diethylaminopropyl 1,2,3,10b-tetrahydrofluoranthene-10b-carboxylate.

ELIOT STEINBERG.

References Cited in the file of this patent

Chemical Abstracts, 44, 12289 (1950).